United States Patent
Kim et al.

(10) Patent No.: US 11,248,072 B2
(45) Date of Patent: Feb. 15, 2022

(54) POLYPROPYLENE AND METHOD FOR PREPARING THE SAME

(71) Applicant: LG Chem, Ltd., Seoul (KR)

(72) Inventors: Seok Hwan Kim, Daejeon (KR); Hyunsup Lee, Daejeon (KR); Seong Min Chae, Daejeon (KR); Taejin Kim, Daejeon (KR); Dae Sik Hong, Daejeon (KR); Sang Jin Jeon, Daejeon (KR); Hee Kwang Park, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/635,730

(22) PCT Filed: Nov. 1, 2018

(86) PCT No.: PCT/KR2018/013198
§ 371 (c)(1),
(2) Date: Jan. 31, 2020

(87) PCT Pub. No.: WO2019/107774
PCT Pub. Date: Jun. 6, 2019

(65) Prior Publication Data
US 2020/0223962 A1    Jul. 16, 2020

(30) Foreign Application Priority Data

Nov. 28, 2017 (KR) .................. 10-2017-0160625
Oct. 31, 2018 (KR) .................. 10-2018-0132203

(51) Int. Cl.
*C08F 110/06* (2006.01)
*C08F 4/6592* (2006.01)
*C07F 17/00* (2006.01)

(52) U.S. Cl.
CPC ............ *C08F 110/06* (2013.01); *C07F 17/00* (2013.01)

(58) Field of Classification Search
CPC .................. C08F 110/06; C08F 4/65927
See application file for complete search history.

(56) References Cited

U.S. PATENT DOCUMENTS

| | | |
|---|---|---|
| 7,569,651 B2 | 8/2009 | Schottek et al. |
| 2003/0149199 A1 | 8/2003 | Schottek et al. |
| 2006/0160962 A1 | 7/2006 | Tonti et al. |
| 2007/0015877 A1 | 1/2007 | Burkhardt et al. |
| 2008/0214767 A1* | 9/2008 | Mehta ............... C08F 10/06 526/351 |
| 2009/0137739 A1 | 5/2009 | Fuchs et al. |
| 2009/0149612 A1 | 6/2009 | Stadlbauer et al. |
| 2009/0259007 A1 | 10/2009 | Ciaccia |
| 2009/0259009 A1 | 10/2009 | Fuchs et al. |
| 2012/0214947 A1 | 8/2012 | Klimke et al. |
| 2014/0121341 A1 | 5/2014 | Holtcamp et al. |
| 2015/0025205 A1* | 1/2015 | Jian .................. C08F 4/76 526/126 |
| 2015/0183893 A1* | 7/2015 | Yang ............... C08F 4/65927 526/127 |
| 2015/0274907 A1 | 10/2015 | MacDonald et al. |
| 2018/0298122 A1 | 10/2018 | Choi et al. |

FOREIGN PATENT DOCUMENTS

| | | |
|---|---|---|
| CN | 1590355 A | 3/2005 |
| CN | 101163723 A | 4/2008 |
| CN | 101291986 A | 10/2008 |
| CN | 102597098 A | 7/2012 |
| CN | 104812779 A | 7/2015 |
| EP | 1648946 A2 | 4/2006 |
| EP | 1979384 A2 | 10/2008 |
| KR | 20020084423 A | 11/2002 |
| KR | 20060029247 A | 4/2006 |
| KR | 20070117609 A | 12/2007 |
| KR | 20090013229 A | 2/2009 |
| KR | 20170108810 A | 9/2017 |
| WO | 2005005495 A2 | 1/2005 |
| WO | 2007088204 A2 | 8/2007 |
| WO | 2008080886 A1 | 7/2008 |
| WO | 2009054833 A2 | 4/2009 |
| WO | 2014070655 A1 | 5/2014 |
| WO | 2014088856 A1 | 6/2014 |

OTHER PUBLICATIONS

Extended European Search Report with Written Opinion for Application No. 18883218.2 dated Oct. 15, 2020, 7 pages.
International Search Report for Application No. PCT/KR2018/013198 dated Jan. 31, 2019, 3 pages.
Chinese Search Report for Application No. 201880046736.9 dated Dec. 13, 2021, 3 pages.

* cited by examiner

*Primary Examiner* — Caixia Lu
(74) *Attorney, Agent, or Firm* — Lerner, David, Littenberg, Krumholz & Mentlik, LLP

(57) ABSTRACT

The present disclosure relates to a polypropylene for injection having a high content of ultra-high molecular weight and excellent rigidity, and a method for preparing the same.

4 Claims, No Drawings

POLYPROPYLENE AND METHOD FOR PREPARING THE SAME

CROSS-REFERENCE TO RELATED APPLICATIONS

The present application is a national phase entry under 35 U.S.C. § 371 of International Application No. PCT/KR2018/013198 filed Nov. 1, 2018, which claims priority from Korean Patent Application No. 10-2017-0160625 filed Nov. 28, 2017 and Korean Patent Application No. 10-2018-0132203 filed Oct. 31, 2018, all of which are incorporated herein by reference.

TECHNICAL FIELD

The present disclosure relates to a polypropylene with a high content of ultra-high molecular weight and excellent rigidity for injection, and a method for preparing the same.

BACKGROUND OF ART

Recently, polyolefin products with low specific gravity have been developed as a substitute for plastics or metals with high specific gravity in order to lighten automobiles. In this process, polyolefin products with higher strength are increasingly required.

Polyolefins are being converted more and more into polypropylene products (mPP) with less odor and low elution characteristics produced by using metallocene catalysts, although products produced by using Ziegler-Natta catalysts are the mainstream.

That is, olefin polymerization catalyst systems may be divided into Ziegler-Natta and metallocene catalyst systems, and these highly active catalyst systems have been developed in accordance with their characteristics. The Ziegler-Natta catalyst has been widely applied to commercial processes since it was developed in the 1950's. However, since the Ziegler-Natta catalyst is a multi-active site catalyst in which a plurality of active sites are mixed, it has a feature that a resulting polymer has a broad molecular weight distribution. Also, since a compositional distribution of comonomers is not uniform, there is a problem that it is difficult to obtain desired physical properties.

On the other hand, the metallocene catalyst includes a main catalyst having a transition metal compound as a main component and an organometallic compound cocatalyst having aluminum as a main component. Such a catalyst is a single-site catalyst which is a homogeneous complex catalyst, and offers a polymer having a narrow molecular weight distribution and a uniform compositional distribution of comonomers, due to the single site characteristics. The stereoregularity, copolymerization characteristics, molecular weight, crystallinity, etc. of the resulting polymer may be controlled by changing a ligand structure of the catalyst and polymerization conditions.

However, as the product to which the metallocene catalyst is applied has a narrow MWD characteristic, the content of ultra-high molecular weight is low and there is a limit in increasing the injection rigidity. Therefore, it is necessary to develop a new polypropylene with a high content of ultra-high molecular weight and a low content of low molecular weight in order to solve this problem.

DETAILED DESCRIPTION OF THE INVENTION

Technical Problem

Accordingly, the present disclosure is to provide a polypropylene for injection, specifically a homo-polypropylene, with a high content of ultrahigh molecular weight and a low content of low molecular weight, which can improve injection rigidity of a product. The present disclosure is also to provide a method for preparing the homo-polypropylene for injection which is excellent in rigidity by polymerization under a low hydrogen input condition using a specific metallocene catalyst having high hydrogen reactivity.

Technical Solution

The present disclosure provides a homo-polypropylene satisfying the following conditions:
(1) a weight average molecular weight is 150,000 to 200,000 g/mol and a molecular weight distribution is 2.4 or less, when measured by GPC;
(2) in a GPC curve in which x-axis is log Mw and y-axis is dw/d log Mw, an integral value in the region where Log Mw is 4.5 or less is 8% or less of an integral value of the entire x-axis;
(3) in a GPC curve in which x-axis is log Mw and y-axis is dw/d log Mw, an integral value in the region where Log Mw is 6 or more is 0.95% or more of an integral value of the entire x-axis; and
a residual stress ratio is 0.20% or more.

In addition, the present disclosure provides a method for preparing the homo-polypropylene, including a step of continuously polymerizing propylene monomers in the presence of a catalyst composition containing 0.1 to 5.0 wt % of a compound represented by the following Chemical Formula 1 under a hydrogen input of 200 ppm or less:

[Chemical Formula 1]

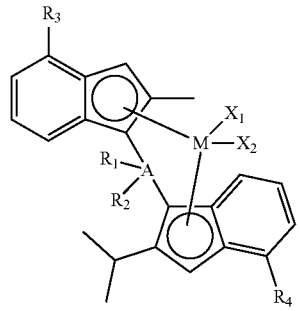

wherein, in Chemical Formula 1,
M is a group 4 transition metal,
$X_1$ and $X_2$ are the same as or different from each other, and are each independently a halogen,
A is silicon or germanium,
$R_1$ and $R_2$ are the same as or different from each other, and are each independently a $C_{1-20}$ alkyl or a $C_{6-20}$ aryl, and
$R_3$ and $R_4$ are the same as or different from each other, and are each independently a $C_{7-40}$ alkylaryl.

Advantageous Effects

According to the present disclosure, it is possible to provide a rigid polypropylene for injection, specifically a homo-polypropylene, having a high content of ultrahigh molecular weight and a low content of low molecular weight with a narrow molecular weight distribution by using a specific metallocene catalyst with high hydrogen reactivity and polymerizing it under a low hydrogen input condition. Therefore, the present disclosure is useful for providing a target MI product having excellent physical properties.

DETAILED DESCRIPTION OF THE EMBODIMENTS

The terms used in this description are just for explaining exemplary embodiments, and are not intended to restrict the present invention. The singular expression may include the plural expression unless it is differently expressed contextually. It must be understood that the word "include", "equip", or "have" in the present description is only used for designating the existence of characteristics, steps, components, or combinations thereof, and does not exclude the existence or the possibility of addition of one or more different characteristics, steps, components, or combinations thereof beforehand.

The present invention may be variously modified and have various forms, and specific examples of the present invention will be explained below. However, it is not intended to limit the present invention to the specific examples, and it must be understood that the present invention includes all modifications, equivalents, or replacements within the spirit and technical scope of the present invention.

Hereinafter, the homo-polypropylene for injection according to preferred embodiment of the present disclosure, and the method for preparing the same, will be described in more detail.

According to an embodiment of the present disclosure, a homo-polypropylene satisfying the following conditions is provided:

(1) a weight average molecular weight is 150,000 to 200,000 g/mol and a molecular weight distribution is 2.4 or less, when measured by GPC;

(2) in a GPC curve in which x-axis is log Mw and y-axis is dw/d log Mw, an integral value in the region where Log Mw is 4.5 or less is 8% or less of an integral value of the entire x-axis;

(3) in a GPC curve in which x-axis is log Mw and y-axis is dw/d log Mw, an integral value in the region where Log Mw is 6 or more is 0.95% or more of an integral value of the entire x-axis; and a residual stress ratio is 0.20% or more.

Generally, it is known that the higher the molecular weight of the polymer, the better the mechanical properties. However, when the polymer is prepared by using a metallocene catalyst, MWD becomes narrower, so that an ultra-high molecular weight content and injection rigidity become low.

Accordingly, the present disclosure is intended to provide a polypropylene for injection having a high content of ultra-high molecular weight and a content of low molecular weight with improved injection rigidity, and a method for preparing the same. Herein, the polypropylene provided by the present disclosure may be a homo-polypropylene.

More specifically, the homo-polypropylene according to one embodiment of the present disclosure has a weight average molecular weight of 150,000 to 200,000 g/mol and a molecular weight distribution (MWD=Mw/Mn) of 2.4 or less, when measured by GPC. That is, the present disclosure can easily prepare a polypropylene having a low molecular weight of less than 200,000 as well as a polypropylene having a molecular weight of 200,000 or more while satisfying a narrow molecular weight distribution of 2.4 or less. Herein, the low molecular weight polypropylene in this disclosure may include a polypropylene having Mw of less than 50,000, and preferably Mw of 40,000 to 30,000 or less. Further, in the present disclosure, the ultra-high molecular weight polypropylene may include a polypropylene having Mw of 500,000 or more, preferably Mw of 800,000 to 1,000,000 or more. The molecular weight may be defined by a criterion that defines integral values (Log Mw 4.5 or less, Log Mw 6.0 or more) on the GPC.

Therefore, the homo-polypropylene of the present disclosure has a low molecular weight of 150,000 to 200,000 and a narrow molecular weight distribution, so that exhibits excellent rigidity upon injection. More preferably, the molecular weight distribution of the homo-polypropylene may be 2.0 to 2.4, more specifically 2.2 to 2.4.

In addition, the present disclosure provides a homo-polypropylene having an increased content of an ultra-high molecular region by an additional reaction between double-bond chain ends of the polymer in order to enhance injection rigidity. This homo-polypropylene is characterized in that an integral value in the region where Log Mw is 4.5 or less is 8% or less of an integral value of the entire x-axis, in a GPC curve in which the x-axis is log Mw and the y-axis is dw/d log Mw. In addition, the homo-polypropylene is characterized in that an integral value in the region where Log Mw is 6 or more is 0.95% or more of an integral value of the entire x-axis, in a GPC curve in which x-axis is log Mw and y-axis is dw/d log Mw. In the above GPC curve, the logarithm of the molecular weight and the mass fraction of the homo-polypropylene are measured by GPC, and shown by the x-axis and y-axis. In the above, Mw refers to a weight-average molecular weight.

Also, as described above, as the content of the ultra-high molecular region of the homo-polypropylene increases, linking polymers between the chains increase compared with the conventional polymer. Therefore, the residual stress ratio of the homo-polypropylene is increased to have a value of 0.20% or more. More preferably, the residual stress ratio may be 0.25% or more and 0.5% or less. The increase in the residual stress ratio leads to improvement of injection strength, however, when the residual stress ratio is excessively high, workability may be lowered. Therefore, the residual stress ratio is preferably within the above range.

The residual stress ratio can be confirmed by a rheological property test. A stress relaxation test is performed by applying a large strain to the homo-polypropylene, and the residual stress ratio may be measured according to the following Equation 1.

$$\text{Residual stress ratio} = (RS_1/RS_0) * 100 \qquad \text{[Equation 1]}$$

In Equation 1, $RS_0$ is a residual stress at any point ($t_0$) of less than 0.05 seconds after applying 200% strain to the homo-polypropylene at 235° C., and $RS_1$ is a residual stress at any point ($t_1$) between 0.05 seconds and 1.50 seconds after applying 200% strain to the homo-polypropylene at 235° C.

When the residual stress ratio of the homo-polypropylene according to the above-mentioned Equation 1 is 0.20% or less, there is a problem that an increasing effect of injection strength is low. Also, when the ratio is too high, there is a problem that workability becomes low. Therefore, the upper limit is preferably 0.5% or less.

In the above Equation 1, $RS_0$ represents a residual stress immediately after applying 200% strain to the homo-polypropylene at 235° C. (for example, at any point ($t_0$) of less than 0.05 seconds). In addition, $RS_1$ represents a residual stress within about 1.5 seconds after to under the same condition as $RS_0$ (for example, at any point ($t_1$) between 0.05 seconds to 2.0 seconds).

Specifically, in Equation 1, $t_0$ may be 0.01 seconds, 0.015 seconds, 0.02 seconds, 0.025 seconds, 0.03 seconds, 0.035 seconds, 0.04 seconds, or 0.045 seconds. In addition, $t_1$ may be 0.05 seconds, 0.10 seconds, 0.20 seconds, 0.30 seconds, 0.40 seconds, 0.50 seconds, 0.60 seconds, 0.70 seconds, 0.80 seconds, 0.90 seconds, 1.00 seconds, 1.10 seconds, 1.20 seconds, 1.30 seconds, 1.40 seconds, 1.50 seconds, 1.60 seconds, 1.70 seconds, 1.80 seconds, 1.90 seconds, or 2.00 seconds. Preferably, to is 0.02 seconds and $t_1$ is 1.00 seconds in the above Equation 2, in order to easily obtain effective data in the measurement of the residual stress.

In addition, the homo-polypropylene may have tensile strength at yield of 350 to 400 kg/cm$^2$, flexural strength of 480 to 520 kg/cm$^2$, and a flexural modulus of 15,500 to 16,800 kg/cm$^2$. These are much higher values compared with a conventional Ziegler-Natta catalyzed homo-PP or metallocene catalyzed homo-PP.

The flexural strength and flexural modulus of the homo-polypropylene refer to values measured by ASTM D790 and are well known in the art. The tensile strength of the homo-polypropylene refers to a value measured by ASTM D638 and is well known in the art.

The homo-polypropylene according to one embodiment of the present disclosure having the above-mentioned physical properties can be prepared by polymerizing propylene monomers in the presence of a catalyst composition containing a specific metallocene compound as a catalytically active component under a condition of low hydrogen input.

More specifically, according to another embodiment of the present disclosure, a method for preparing the homo-polypropylene of claim 1 can be provided, wherein the method includes a step of continuously polymerizing propylene monomers in the presence of a catalyst composition containing 0.1 to 5.0 wt % of a compound represented by the following Chemical Formula 1 under a hydrogen input of 200 ppm or less:

[Chemical Formula 1]

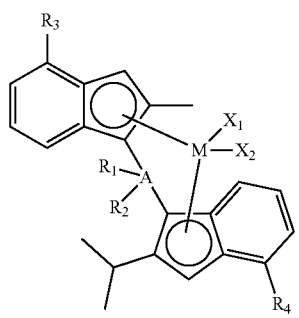

wherein, in Chemical Formula 1,
M is a group 4 transition metal,
$X_1$ and $X_2$ are the same as or different from each other, and are each independently a halogen,
A is silicon or germanium,
$R_1$ and $R_2$ are the same as or different from each other, and are each independently a $C_{1-20}$ alkyl or a $C_{6-20}$ aryl, and $R_3$ and $R_4$ are the same as or different from each other, and are each independently a $C_{7-40}$ alkylaryl.

In the present disclosure, the specific metallocene catalyst of Chemical Formula 1 having high hydrogen reactivity is used to prepare a target MI product under a low hydrogen input. According to the present disclosure, the polymerization proceeds under a low hydrogen content condition, thereby inducing an additional reaction between the double-bond chain ends to prepare a homo-polypropylene having a high content of ultra-high molecular weight.

As a result of measuring rheological properties and injection properties of the homo-polypropylene having a high content of ultra-high molecular weight prepared by this method, it can be confirmed that rigidity is improved. In addition, the present disclosure can provide a homo-polypropylene having a low content of low molecular weight.

Meanwhile, unless otherwise specified herein, the following terms may be defined as follows.

The halogen may be fluorine (F), chlorine (Cl), bromine (Br), or iodine (I).

The $C_{1-20}$ alkyl group may be a linear, branched, or cyclic alkyl group, more preferably a linear or branched alkyl group. Specifically, the $C_{1-20}$ alkyl group may be a $C_{1-15}$ linear alkyl group; a $C_{1-10}$ linear alkyl group; a $C_{1-5}$ linear alkyl group; a $C_{3-20}$ branched or cyclic alkyl group; a $C_{3-15}$ branched or cyclic alkyl group; or a $C_{3-10}$ branched or cyclic alkyl group. More specifically, the $C_{1-20}$ alkyl group may be a methyl group, an ethyl group, an n-propyl group, an iso-propyl group, an n-butyl group, an iso-butyl group, a tert-butyl group, an n-pentyl group, an iso-pentyl group, a neo-pentyl group, a cyclohexyl group, or the like.

The $C_{6-20}$ aryl may be a monocyclic, bicyclic, or tricyclic aromatic hydrocarbon. Specifically, the $C_{6-20}$ aryl may be phenyl, naphthyl, anthracenyl, or the like.

The $C_{7-40}$ alkylaryl may include substituents in which at least one hydrogen of the aryl is substituted with $C_{1-20}$ alkyl. Specifically, the $C_{7-40}$ alkylaryl may be methylphenyl, ethylphenyl, n-propylphenyl, iso-propylphenyl, n-butylphenyl, iso-butylphenyl, tert-butylphenyl, cyclohexylphenyl, or the like.

The catalyst composition used for preparing the homo-polypropylene according to one embodiment of the present disclosure includes the compound of Chemical Formula 1 as a single catalyst. As a result, the molecular weight distribution can be remarkably narrowed as compared with homo-polypropylenes prepared by using the conventional catalyst composition containing two or more catalysts.

In Chemical Formula 1, A may be silicon. The substituents of A, $R_1$, and $R_2$, are the same in terms of improving solubility and supporting efficiency, and may be a $C_{1-10}$ alkyl group, more specifically a $C_{1-6}$ linear or branched alkyl, or a $C_{1-4}$ linear or branched alkyl, even more specifically a methyl, ethyl, or tert-butyl, respectively.

In addition, both of the two indenyl groups, which are ligands, are substituted with different functional groups, isopropyl and methyl, at a position 2, thereby exhibiting higher hydrogen reactivity than a catalyst having two identical indenyl groups. Thus, it can provide a desired MI product even under a low hydrogen condition.

Preferably, $R_3$ and $R_4$ may each independently be a phenyl group substituted with a $C_{1-6}$ branched alkyl group, and more specifically, a phenyl group substituted with a $C_{3-6}$ branched alkyl group such as tert-butylphenyl. The substituting position of the alkyl group with respect to the phenyl group may be a position of $R_3$ or $R_4$ bonded to the indenyl group, or a position 4 corresponding to a para position.

In the above Chemical Formula 1, $X_1$ and $X_2$ may each independently be chloro.

A representative example of the compound represented by the above Chemical Formula 1 may be any one of the following structures:

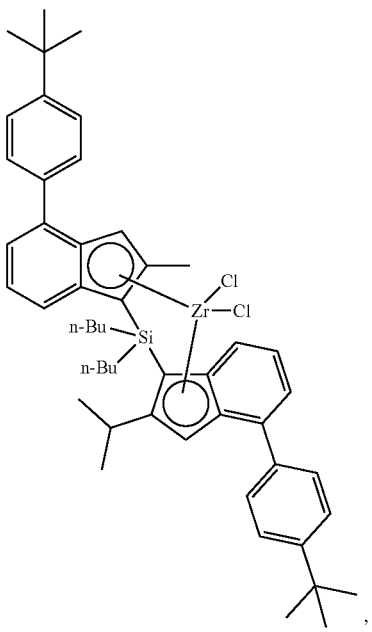

,

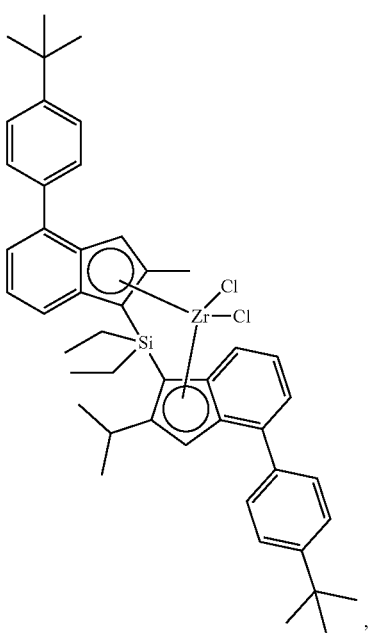

,

Further, when preparing a homo-polypropylene in the present disclosure, a hydrogen input can be reduced to 200 ppm or less by using the catalyst of a compound represented by Chemical Formula 1.

Therefore, the present disclosure can easily prepare a polypropylene having a low molecular weight of less than 200,000 as well as a polypropylene having a molecular weight of 200,000 or more while satisfying a narrow molecular weight distribution of 2.4 or less.

In addition, the homo-polypropylene may be prepared by a continuous polymerization process in which a catalyst composition containing the compound represented by Chemical Formula 1 and propylene are used, and brought into contact under a low hydrogen gas content.

Specifically, the hydrogen gas may be charged at a low content of about 200 ppm or less, about 100 to about 200 ppm, or about 100 to about 180 ppm, based on a total weight of the propylene. Even when the hydrogen gas content is low, the catalyst of the present disclosure has high hydrogen reactivity and thus exhibits sufficient catalytic activity. Therefore, the molecular weight distribution of the prepared homo-polypropylene can be narrowed, and a homo-polypropylene having a high content of ultra-high molecular weight can be prepared.

The homo-polypropylene can be prepared by a continuous polymerization process. For example, various polymerization processes known for the polymerization of olefinic monomers such as a continuous gas phase polymerization process, a solution polymerization process, a bulk polymerization process, a suspension polymerization process, a slurry polymerization process, or an emulsion polymerization process may be applied. Preferably, a continuous gas phase polymerization process or a bulk-slurry polymerization process is better in order to obtain a uniform molecular weight distribution and to produce commercial products.

As a specific example, the polymerization of the present disclosure can be carried out according to a continuous slurry polymerization method using a prepolymerization reactor and a loop reactor.

This method of the present disclosure may use a reaction apparatus in which a prepolymerization reactor and a loop reactor are continuously provided, and a catalyst composition containing 0.1 to 5.0 wt % of the compound of Chemical Formula 1.

More preferably, the method for preparing the homopolypropylene may include steps of:

introducing a catalyst composition containing 0.1 to 5.0 wt % of a compound represented by Chemical Formula 1 and propylene monomers into a prepolymerization reactor;

continuously transferring the mixture of the catalyst composition and the propylene monomers introduced into the prepolymerization reactor to a loop reactor; and polymerizing the propylene monomers in the loop reactor into which 200 ppm or less of hydrogen is charged.

In the present disclosure, the catalyst composition containing the compound of Chemical Formula 1 is prepared and then introduced into a prepolymerization reactor together with the propylene monomers to carry out a prepolymerization in which the compound of Chemical Formula 1 is first contacted with the propylene monomers.

Thereafter, the prepolymerized mixture of the compound of Chemical Formula 1 and the propylene monomers is transferred to a loop reactor connected to the prepolymerization reactor, and main polymerization is carried out in the loop reactor. At the time of the main polymerization, a device for charging hydrogen into the loop reactor may be provided.

Herein, the catalyst composition containing the compound of Chemical Formula 1 may be introduced into the reactor in the form of a dispersion solution (in the form of a mud catalyst) using a dispersant. Thus, upon introduction into the polymerization reactor, the catalyst composition may be a dispersion solution further containing a dispersant in addition to the catalyst composition containing 0.1 to 5 wt % of the compound of Chemical Formula 1. The dispersant may be a mixed solution of an oil and a grease. The oil may be a mineral oil.

According to a preferred embodiment, the present disclosure may first prepare a catalyst composition containing a catalyst (preferably a supported catalyst) having 0.1 to 5 wt % of Chemical Formula 1 (hereinafter referred to as a first catalyst composition), and then mix with the oil/grease, which is a dispersant, to prepare a dispersion solution (hereinafter referred to as a second catalyst composition) before the polymerization. Therefore, the catalyst composition introduced into the prepolymerization reactor and the loop reactor may be the second catalyst composition.

The second catalyst composition may be a solution prepared so that the content of the first catalyst composition is 10 to 30 wt % based on the weight of the oil/grease.

Preferably, the polymerization reaction of the present disclosure uses the second catalyst composition in which 10 to 30 wt % or 10 to 20 wt % of the first catalyst composition containing the compound of Chemical Formula 1 is dispersed in the mixture of oil and grease. When the content of the first catalyst composition in the second catalyst composition is less than 10 wt %, the gas phase polymerization does not proceed smoothly. When the content of the first catalyst composition exceeds 30 wt %, the polymerization reaction is difficult to control.

It is also preferable that the catalyst composition and the propylene monomers stay in the prepolymerization reactor for 5 to 10 minutes. The prepolymerization reactor may be at a temperature of 0 to 20° C. and a pressure of 10 to 30 kgf/cm².

It is preferable that the catalyst composition and the propylene monomers stay in the loop reactor for 50 to 120 minutes.

The polymerization reaction in the loop reactor may be carried out at a temperature of about 40 to 110° C. or about 60 to 100° C., and a pressure of about 1 to 100 kgf/cm².

Further, the polymerization may be carried out for 50 minutes to 120 minutes.

In the polymerization reaction, the catalyst may be used in a dissolved or diluted form in a solvent such as pentane, hexane, heptane, nonane, decane, toluene, benzene, dichloromethane, chlorobenzene, and the like. Herein, the solvent may be treated with a small amount of alkylaluminum to remove a small amount of water, air, or the like which can adversely affect the catalyst.

Meanwhile, the compound of Chemical Formula 1 can be synthesized by applying known reactions, and a more detailed synthesis method can be referred to the following examples.

The compound of Chemical Formula 1 may be used as a single component or in the form of a supported catalyst supported on a support.

The support may have hydroxy groups on its surface. Preferably, the support may have both the highly reactive hydroxyl group and siloxane group, which is dried and from which moisture is removed from the surface. For example, silica, silica-alumina, or silica-magnesia, which is dried at a high temperature, can be used, and it may usually contain oxides, carbonates, sulfates, or nitrates such as $Na_2O$, $K_2CO_3$, $BaSO_4$, $Mg(NO_3)_2$, and the like.

The support is preferably dried at 200 to 800° C., more preferably at 300 to 600° C., and most preferably at 400 to 600° C. If the drying temperature of the support is lower than 200° C., it contains too much moisture so that moisture on the surface reacts with the cocatalyst. If the drying temperature is higher than 800° C., pores on the surface of the support are combined with each other to reduce the surface area, and many hydroxyl groups are lost on the surface, leaving only siloxane groups. Thus, the reactive sites with cocatalyst are reduced, which is not preferable.

The amount of hydroxyl groups on the surface is preferably 0.1 to 10 mmol/g, and more preferably 0.5 to 1 mmol/g. The amount of hydroxy groups may be controlled by the preparation method, the preparation conditions, or the drying conditions such as temperature, time, vacuum, or spray drying of the support.

If the amount of hydroxyl groups is less than 0.1 mmol/g, reactive sites with the cocatalyst are reduced. If the amount of hydroxyl groups is more than 10 mmol/g, it is not desirable because it may be caused by moisture besides the hydroxyl groups present on the surface of support particles.

When supported on the support, a weight ratio of the compound of Chemical Formula 1 to the support is preferably 1:1 to 1:1000. When the support and the compound of Chemical Formula 1 are contained within the above weight ratio, they exhibit appropriate activity of the supported catalyst, which may be advantageous in terms of maintaining catalytic activity and economical efficiency.

In addition, when the above cocatalyst is supported, the content thereof may be 8 to 25 mmol, preferably 10 to 20 mmol, per 1 weight of the support, for example, 1 g of silica.

In addition, in the above catalyst composition, the compound represented by Chemical 1 may further include a cocatalyst in addition to the support in terms of improving the activity and stability. The cocatalyst may include at least one compound represented by the following Chemical Formula 2, 3, or 4:

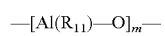     [Chemical Formula 2]

wherein, in Chemical Formula 2, $R_{11}$ are the same as or different from each other, and each is independently a halogen; a $C_{1-20}$ hydrocarbon; or a $C_{1-20}$ halogen-substituted hydrocarbon; and m is an integer of 2 or more, $$J(R_{12})_3 \quad \text{[Chemical Formula 3]}$$

wherein, in Chemical Formula 3,
$R_{12}$ is as defined in Chemical Formula 2; and
J is aluminum or boron, $$[E-H]^+[ZA_4]^- \text{ or } [E]^+[ZA_4]^- \quad \text{[Chemical Formula 4]}$$

wherein, in Chemical Formula 4,
E is a neutral or cationic Lewis base,
H is a hydrogen atom;
Z is a Group 13 element; and
each A is the same as or different from each other, and each is independently a $C_{6-20}$ aryl or $C_{1-20}$ alkyl group, of which one or more hydrogen atoms are substituted or unsubstituted with a halogen, a $C_{1-20}$ hydrocarbon, alkoxy, or phenoxy.

Examples of the compound represented by Chemical Formula 2 may include methylaluminoxane, ethylaluminoxane, isobutylaluminoxane, butylaluminoxane, and the like, and a more preferred compound is methylaluminoxane.

Examples of the compound represented by Chemical Formula 3 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminummethoxide, trimethylboron, triethylboron, triisobutylboron, tripropylboron, tributylboron, and the like, and a more preferred compound is selected from trimethylaluminum, triethylaluminum, and triisobutylaluminum.

Examples of the compound represented by Chemical Formula 4 may include triethylammonium tetraphenylboron, tributylammonium tetraphenylboron, trimethylammonium tetraphenylboron, tripropylammonium tetraphenylboron, trimethylammonium tetra(p-tolyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o, p-dimethylphenyl)aluminum, tributylammonium tetra(p-trifluoromethylphenyl)aluminum, trimethylammonium tetra(p-trifluoromethylphenyl)aluminum, tributylammonium tetrapentafluorophenylaluminum, N, N-diethylanilinium tetraphenylaluminum, N,N-diethylanilinium tetrapentafluorophenylaluminum, diethylammonium tetrapentatetraphenylaluminum, triphenylphosphonium tetraphenylaluminum, trimethylphosphonium tetraphenylaluminum, tripropylammonium tetra(p-tolyl)boron, triethylammonium tetra(o,p-dimethylphenyl)boron, tributylammonium tetra(p-trifluoromethylphenyl)boron, triphenylcarbonium tetra(p-trifluoromethylphenyl)boron, triphenylcarbonium tetrapentafluorophenylboron, and the like.

When the catalyst composition contains both the support and the cocatalyst, it may be prepared by supporting the cocatalyst compound on the support, and supporting the compound represented by Chemical Formula 1 on the support. Herein, the supporting order of the cocatalyst and the compound of Chemical Formula 1 can be changed, if necessary. In the preparation of the catalyst composition, a hydrocarbon-based solvent such as pentane, hexane, heptane, or the like, or an aromatic solvent such as benzene, toluene, or the like, may be used as a reaction solvent.

In the catalyst composition of the present disclosure, for example, the metallocene supported catalyst containing the compound of Chemical Formula 1 can be prepared by reacting a silica support with a cocatalyst, removing solvents from the upper part after the precipitation, washing with solvents, and then adding a catalyst precursor. Accordingly, the metallocene supported catalyst of the present disclosure may have a structure in which an alkylaluminoxane-based cocatalyst and a metallocene compound represented by the following Chemical Formula 1 are sequentially supported on a support.

In the method for preparing the supported metallocene catalyst of the present disclosure, the reaction may proceed under an inert atmosphere.

Hereinafter, preferred examples are provided for better understanding. However, these examples are for illustrative purposes only, and the invention is not intended to be limited by these examples.

Comparative Examples 1 to 4 and Examples 1 to 3

Preparation of Metallocene Supported Catalyst

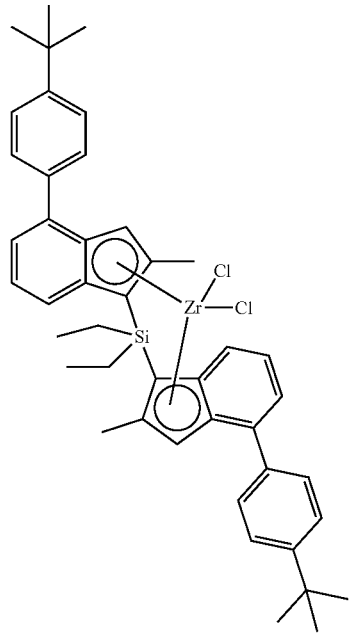

Silica gel (SYLOPOL 952X, calcined at 250° C., 100 g) was placed in a 2 L reactor under an Ar condition, and 766 mL of methylaluminoxane (MAO) was slowly added thereto at room temperature, and stirred at 90° C. for 15 hours. After completion of the reaction, the reaction mixture was cooled down to room temperature, allowed to stand for 15 minutes, and decanted using a cannula. Thereafter, 400 mL of toluene was added to the reaction product, stirred for 1 minute, allowed to stand for 15 minutes, and the solvent was decanted using a cannula.

Each catalyst (700 μmol) of Table 1 was dissolved in 400 mL of toluene, and the catalyst-containing solution was transferred to the reactor using a cannula. After stirring at 50° C. for 5 hours, the mixture was cooled down to room temperature and allowed to stand for 15 minutes, and the solvent was decanted using a cannula. 400 mL of toluene was added thereto, stirred for 1 minute, allowed to stand for 15 minutes, and the solvent was removed using a cannula. This solvent-removing process was carried out twice. Thereafter, 400 mL of hexane was added thereto, stirred for 1 minute, allowed to stand for 15 minutes, and the solvent was decanted using a cannula. Then, the antistatic agent (Atmer 163.3 g) was dissolved in 400 mL of hexane and transferred to the reactor using a cannula. The mixture was stirred at room temperature for 20 minutes, and the reaction product was transferred to a glass filter to remove the solvent, dried under vacuum for 5 hours, and vacuum-dried at 45° C. for 4 hours to obtain respective supported catalysts.

Preparation of Homo-Polypropylene (Manufactured in a Continuous Pilot Plant)

Each catalyst composition was mixed with oil/grease to prepare a 16 wt % mixture (in the form of a mud catalyst). Thereafter, the mixture and 20 kg/h of propylene were introduced to a pre-polymerization reactor (reactor temperature: 20° C., pressure: 15 kgf/cm$^2$) and left for 8 min, followed by continuously being transferred to a loop reactor.

At this time, hydrogen was introduced into the loop reactor together with propylene in the same amount as in Table 2, and the reactor temperature was maintained at 70° C. to prepare a homo-polypropylene (left in the loop reactor for 2 hours, pressure: 38 kgf/cm$^2$). After completion of the reaction, unreacted propylene was vented.

TABLE 1

| ZN127VS Purchased from Lyondellbasell Ziegler-Natta | Comp. Ex. 1 |
|---|---|
| 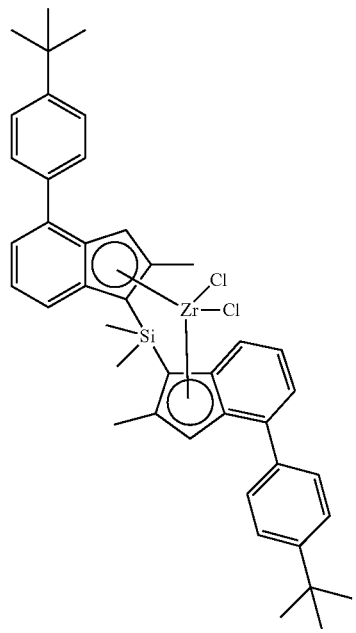 mCat1 | Comp. Ex. 2 |

TABLE 1-continued

| 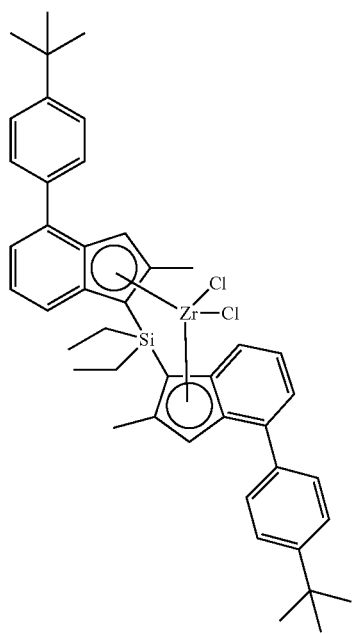 mCat2 | Comp. Ex. 3 |
|---|---|
| 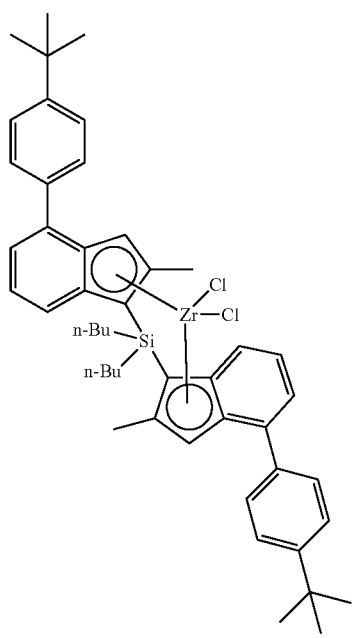 mCat3 | Comp. Ex. 4 |

TABLE 1-continued

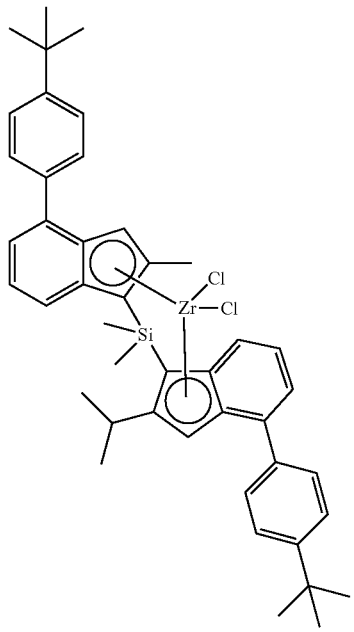

Example 1 mCat4

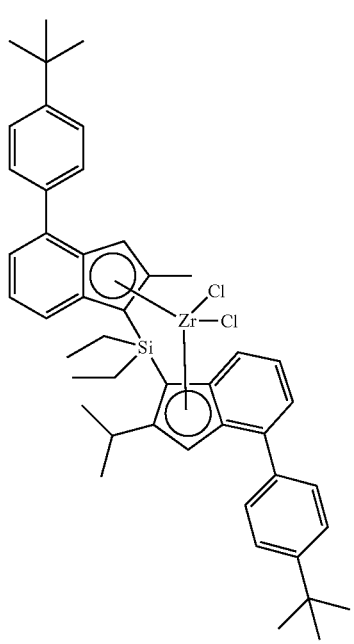

Example 2 mCat5

TABLE 1-continued

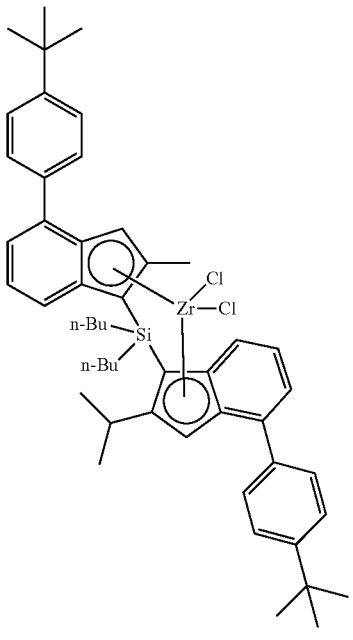

Example 3 mCat6

Experimental Example 1

The properties of the polymers of Examples 1 to 3 and Comparative Examples 1 to 3 were evaluated by the following methods in a conventional manner.

(1) Weight average molecular weight (Mw) and molecular weight distribution (MWD, polydispersity index) of the polymer, GPC curve. The weight average molecular weight (Mw) and the number average molecular weight (Mn) of the polymer were measured using a gel permeation chromatography (GPC, manufactured by Waters). The molecular weight distribution (PDI) was calculated by dividing the weight average molecular weight by the number average molecular weight (results: see Table 2).

Specifically, a polymer sample was pretreated by dissolving in 1,2,4-trichlorobenzene containing 0.0125% BHT at 160° C. for 10 hours using PL-SP260 equipment. Then, the number average molecular weight and the weight average molecular weight were measured by standardizing with polystyrene at 160° C. using PL-GPC220 equipment. The molecular weight distribution was represented by the ratio of the weight average molecular weight to the number average molecular weight.

(2) Log Mw (<4.5) and Log Mw (>6.0): They were calculated from the above GPC curve.

(3) Residual stress ratio

For the homo-polypropylene according to the examples and comparative examples, a sample was taken and 200% strain was applied thereto at 235° C., respectively. Thereafter, a change in the residual stress was measured for 10 minutes.

The residual stress was measured using a Discovery Hybrid Rheometer (DHR) from TA Instruments. The sample was sufficiently loaded between upper and lower plates with a diameter of 25 mm, and melted at 235° C. Then, the gap was fixed at 1 mm and the residual stress was measured.

Based on the measured residual stress data, the residual stress ratio (RS %) was calculated according to the following Equation 1, and the results are shown in Table 3 below:

$$\text{Residual stress ratio}(Y) = (RS_1/RS_0)*100 \qquad \text{[Equation 1]}$$

wherein, in Equation 1, $RS_0$ is a residual stress at 0.02 seconds (to) after applying 200% strain to a synthetic resin sample at 235° C., and $RS_1$ is a residual stress at 1.00 seconds ($t_1$) after applying 200% strain to a synthetic resin sample at 235° C.

(4) Tensile Strength at Yield (kg/cm$^2$): It was measured in accordance with ASTM D790.

(5) Flexural modulus (kg/cm$^2$): It was measured for the homo-polypropylene of the examples and comparative examples in accordance with ASTM D790.

(6) Flexural Strength (kg/cm$^2$): It was measured for the homo-polypropylene of the examples and comparative examples in accordance with ASTM D638.

TABLE 2

| | Catalyst | H$_2$ (ppm) | MW | MWD | Note |
|---|---|---|---|---|---|
| Comp. Ex. 1 | ZN127VS | — | 188429 | 3.00 | Peroxide cracking |
| Comp. Ex. 2 | GmCat1 | 400 | 187223 | 2.32 | — |
| Comp. Ex. 3 | GmCat2 | 400 | 155271 | 2.37 | — |
| Comp. Ex. 4 | GmCat3 | 400 | 166380 | 2.34 | — |
| Ex. 1 | GmCat4 | 180 | 174533 | 2.29 | — |
| Ex. 2 | GmCat5 | 180 | 171200 | 2.30 | — |
| Ex. 3 | GmCat6 | 180 | 160079 | 2.31 | — |

The GPC and rheological properties of the polypropylene of the examples and comparative examples were analyzed by the above-mentioned methods, respectively, and the results are shown in Table 3.

TABLE 3

| | Catalyst | Mw | Log Mw (<4.5)* | Log Mw (>6.0)* | Residual stress ratio (%) |
|---|---|---|---|---|---|
| Comp. Ex. 1 | ZN127VS | 188429 | 9.81% | 0.98% | 0.04 |
| Comp. Ex. 2 | GmCat1 | 180023 | 9.91% | 0.27% | 0.04 |
| Comp. Ex. 3 | GmCat2 | 155271 | 10.01% | 0.24% | 0.03 |
| Comp. Ex. 4 | GmCat3 | 172380 | 9.96% | 0.26% | 0.03 |
| Ex. 1 | GmCat4 | 174533 | 7.81% | 0.99% | 0.26 |
| Ex. 2 | GmCat5 | 171200 | 7.92% | 0.98% | 0.28 |
| Ex. 3 | GmCat6 | 168079 | 7.97% | 0.95% | 0.25 |

The injection properties of the polypropylene of the examples and comparative examples were evaluated by the above-mentioned methods, respectively, and the results are shown in Table 4.

TABLE 4

| | Catalyst | Tensile Strength at Yield (kg/cm$^2$) | Flexural Strength (kg/cm$^2$) | Flexural Modulus (kg/cm$^2$) |
|---|---|---|---|---|
| Comp. Ex. 1 | ZN127VS | 338 | 451 | 15049 |
| Comp. Ex. 2 | GmCat1 | 330 | 450 | 15100 |
| Comp. Ex. 3 | GmCat2 | 338 | 467 | 15363 |
| Comp. Ex. 4 | GmCat3 | 333 | 449 | 14950 |
| Ex. 1 | GmCat4 | 371 | 510 | 16500 |
| Ex. 2 | GmCat5 | 373 | 507 | 16752 |
| Ex. 3 | GmCat6 | 369 | 506 | 16625 |

Referring to Tables 2 to 4, it can be confirmed that Examples 1 to 3 of the present disclosure have excellent injection properties with a low content of low molecular weight and a high content of ultra-high molecular weight, as compared with Comparative Examples 1 to 4.

The invention claimed is:

1. A homo-polypropylene satisfying the following conditions:

(1) a weight average molecular weight is 150,000 to 200,000 g/mol and a molecular weight distribution is 2.4 or less, when measured by GPC;

(2) in a GPC curve in which x-axis is log Mw and y-axis is dw/d log Mw, an integral value in the region where Log Mw is 4.5 or less is 8% or less of an integral value of the entire x-axis;

(3) in a GPC curve in which x-axis is log Mw and y-axis is dw/d log Mw, an integral value in the region where Log Mw is 6 or more is 0.95% or more of an integral value of the entire x-axis; and a residual stress ratio is 0.20% or more.

2. The homo-polypropylene of claim 1,
wherein the molecular weight distribution measured by GPC is 2.0 to 2.4.

3. The homo-polypropylene of claim 1,
wherein tensile strength at yield is 350 to 400 kg/cm$^2$, flexural strength is 480 to 520 kg/cm$^2$, and a flexural modulus is 15,500 to 16,800 kg/cm$^2$.

4. The homo-polypropylene of claim 1,
wherein the residual stress ratio is 0.20 to 0.50% or less.

* * * * *